(12) United States Patent
Schubring et al.

(10) Patent No.: US 6,339,221 B1
(45) Date of Patent: Jan. 15, 2002

(54) FERROELECTRIC THERMOMETRY AND PYROMETRY BY ACTIVE OPERATION

(75) Inventors: Norman William Schubring, Troy; Joseph Vito Mantese, Shelby Township, Macomb County; Adolph Louis Micheli, Harrison Township, Macomb County; Antonio Buddy Catalan, Sterling Heights, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/454,871

(22) Filed: Dec. 3, 1999

Related U.S. Application Data (63) Continuation-in-part of application No. 09/241,149, filed on Feb. 1, 1999.

(51) Int. Cl.[7] .................................................. G01J 5/10
(52) U.S. Cl. .................................. 250/338.3; 250/338.2
(58) Field of Search ............................ 250/338.3, 338.2

(56) References Cited

U.S. PATENT DOCUMENTS

| 5,272,341 A | 12/1993 | Micheli et al. |
| 5,386,120 A | 1/1995 | Micheli et al. |
| 5,448,067 A | 9/1995 | Micheli |

*Primary Examiner*—Constantine Hannaher
(74) *Attorney, Agent, or Firm*—Thomas N. Twomey (57) ABSTRACT

A ferroelectric/pyroelectric sensor that employs a technique for determining a charge output of a pyroelectric element of the sensor by measuring the hysteresis loop output of the element several times during a particular time frame for the same temperature. An external AC signal is applied to the pyroelectric element to cause the hysteresis loop output from the element to switch polarization. Charge integration circuitry, such as a combination capacitor and operational amplifier, is employed to measure the charge from the element. A mechanical shutter is not used, and thus the charge integration output from the element is directly proportional to the incident radiation thereof.

22 Claims, 4 Drawing Sheets

FERROELECTRIC THERMOMETRY AND PYROMETRY BY ACTIVE OPERATION

CROSS-REFERENCE TO RELATED APPLICATION

This application is a continuation-in-part application of U.S. patent application Ser. No. 09/241,149, filed Feb. 1, 1999, titled Pyroelectric Sensor Sensitivity Enhanced by Active Hysteresis Excitation.

BACKGROUND OF THE INVENTION

1. Field of the Invention

This invention relates generally to pyroelectric sensors and, more particularly, to a method of determining the polarization state of a pyroelectric element by applying an AC signal to the element and calculating the hysteresis loop switching energy of the element where the spontaneous polarization reversal of the element is used as a time-varying function and the charge integration is directly proportional to the temperature of the element.

2. Discussion of the Related Art

A certain class of sensors make use of ferroelectric materials, and their pyroelectric effect for detection of temperature change. Sensors of this type have a wide range of applications, such as imaging in low visibility conditions, for example, poor weather conditions, night vision, etc. A ferroelectric material is a dielectric material that has a temperature dependent spontaneous electrical polarization in the absence of an externally applied electric field which can change state with the application of a critical field, where the polarization magnitude and direction within the ferroelectric material is identifiable by a hysteresis loop. The orientation of the polarization of the material can be changed by applying a reversing external electric field to the material. The electric dipoles within the material, that identify the orientation of the polarization, change when the external field is applied and in a proper circuit layout produce a hysteresis loop. Since spontaneous polarization is generally temperature dependent, ferroelectric materials can employ the pyroelectric effect for temperature detection purposes.

Figure 1:
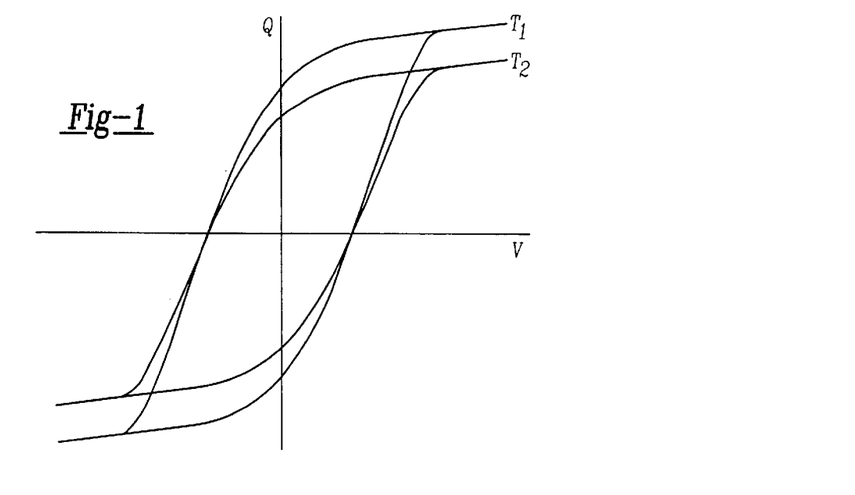
FIG. 1 is a graph with charge on the vertical axis and voltage potential on the horizontal axis showing the hysteresis loop response of a pyroelectric element for both temperature $T_1$ and temperature $T_2$.

Any area of the hysteresis loop, either the entire saturated hysteresis area or merely a region of operation anywhere within the full loop, is representative of the switching energy required to change the polarization state of some or all the dipoles which make up the atomic lattice structure of the material at a given temperature for the specific state of excitation. Any change in radiation incident on the ferroelectric material, if absorbed, changes the temperature, and thus changes the associated loop area. FIG. 1 shows two charge versus voltage hysteresis loops for a particular ferroelectric material at a first temperature $T_1$ and a second temperature $T_2$. If plotted independent of physical dimensions, the magnitude of an externally applied alternating electric field is given on the horizontal axis and polarization, in charge density, is given on the vertical axis. The area of the charge versus voltage hysteresis loop of a ferroelectric material has dimensions of energy, and the loop area is a direct function of its temperature. The magnitude of the polarization changes with a change in the temperature of the ferroelectric material for a given electric field. A careful review of the two hysteresis loops in FIG. 1 will show that for the two different temperatures $T_1$ and $T_2$, the area within the loop is different. Consequently, an electrical measurement of the change in area anywhere within the major loop is an electrical signal corresponding to the change of the temperature of the material, and thus of the incident infrared radiation. The effect is of a dynamic nature due to the switching between polarization states of the pyroelectric material.

The spontaneous polarization $P_s$ of a ferroelectric medium is a function of temperature T:

$$P_s = P_s(T) \tag{1}$$

The pyroelectric coefficient p, $$p = dP_s/dT, \tag{2}$$

is a temperature-rate of electric charge effect, that is often used as a pyroelectric quality factor for judging a particular ferroelectric material. The pyroelectric coefficient p is particularly sensitive in the vicinity of a Curie temperature, which marks a phase transition in the ferroelectric material. However, following a discreet change in temperature T, any external evidence of $P_s$, by its associated electric field $E_s$, is only a transient phenomenon because of the unavoidable thermally generated free-charge, which rapidly neutralizes the $E_s$. To overcome the transient nature of the measurable external evidence of $P_s$, all ferroelectric pyrometry to date has been based on the concept of forcing the temperature to become a function of time as:

$$T = T(t). \tag{3}$$

Therefore, $$P_s = P_s\{T(t)\}. \tag{4}$$

Generally, the temperature T is converted to a time-varying function by mechanically shuttering a window between the heat energy source and the ferroelectric pyroelectric sensor. Unfortunately, the shuttering action rejects essentially one-half of the incident thermal power, which seriously decreases the signal-to-noise ratio. Furthermore, the need for a shutter between the sensor and the thermal source distinctly limits its use to the detection of only radiated heat, particularly infrared radiation.

A ferroelectric unit cell possesses two stable spontaneous polarization states $P_s$. This bi-modal condition exists while the selective material remains in a specific temperature range. The spontaneously separated ± bound-charge forms a dipole-moment. This dipole moment can be reversed by an opposing E-field if it is of sufficient magnitude. By locking in a residual orientation, the dipole memorizes the polarity of the most recently applied polarizing-reversing external E-field. This phenomenon is the operating principal of the ferroelectric random access memory (FRAM).

Coulomb's Law suggests that the dipole-moment can be seen to represent stored potential energy, within the static, unexcited unit cell. At the instant of dipole reversal, and the immediate removal of the externally applied E-field, a spontaneous electric field $E_s$ would instantly appear across two hypothetical parallel plate electrodes positioned at the two surfaces of the cell that are oriented orthogonal to the dipole-moment. However, in a realizable, practical material at non-cryogenic temperatures, the omnipresent thermally-generated free charge will automatically migrate toward the bound charges, and reside in a posture so as to effect total neutralization of the externally observable $E_s$ field. The $E_s$ field must experience an exponential decay to zero, as determined by the resistivity times permittivity ($\rho\epsilon$) time-constant of the material that can be expressed as:

$$E_s = [P_s \epsilon] \exp(-t/\rho\epsilon). \tag{6}$$

Therefore, it is clear that $P_s$ in a ferroelectric capacitative structure, generally cannot be directly measured in a static manner, because $E_s$ as observed at the cell boundaries is a transient phenomenon. Consequently, to try to overcome the time-constant restriction, clever dynamic methods must be employed to effect a reliable measurement of $P_s$.

When a ferroelectric material, such as a crystal, ceramic, film, etc., consisting of numerous randomly oriented domains, each consisting of many such self-polarized unit cells, is excited with a time-dependent alternating electric field E, a time-independent display of $P_s$ vs. E defines a directional hysteresis loop. A necessary condition for there to be any external evidence of $P_s$ is that the period of the alternating excitation, 1/f must be short compared to the $\rho\epsilon$ time constant as:

$$(1/f)<<\rho\epsilon \tag{7}$$

or $$f>>(1/\rho\epsilon), \tag{8}$$

to insure that free-charge is denied the time necessary to neutralize the rapidly reversing bound-charge, and the $P_s$ values remain essentially undiminished from their theoretical values. The area of the $P_s$ vs. E loop has the units of energy density, i.e., $$w=\text{Total Energy W/Volume}, \tag{9}$$

or in other words, energy per unit volume.

Since $P_s=P_s(T)$, the area of the time independent loop display of $P_s$ vs. E is a direct measure of the temperature of the material. The electric displacement D in a ferroelectric material can be expressed as:

$$D=\epsilon E \pm P_s=\epsilon_0 E+P_{elastic} \pm P_s, \tag{10}$$

where $\epsilon_0$ is the permittivity of free space.

In practice, the ferroelectric material must be structured with plate electrodes in the form of a capacitor. Therefore, the more practical measurement properties, namely, charge Q and voltage V, of a ferroelectric capacitor can then be written as $$Q=CV \pm P_s A=C_0 V+Q_{elastic} \pm P_s A, \tag{11}$$

where A is the area of the electrode.

A portrayal of $P_s$ vs. T will show that $P_s$ diminishes abruptly as an increasing T approaches the Curie Temperature $T_c$, where $T_c$ indicates a phase transition in the ferroelectric material. It is the abrupt change in spontaneous polarization over the narrow temperature range, albeit a transient phenomenon, that has been exploited in non-cryogenically cooled night vision systems, by introducing time-rate measurements.

The derivative of spontaneous polarization with respect to temperature is defined as the pyroelectric coefficient p:

$$p=dP_s/dT \tag{12}$$

However, the derivative of spontaneous polarization with respect to time is a pyroelectric current density given as:

$$J_p=dP_s/dt, \tag{13}$$

which is a measurable entity. Therefore, combining the two rate expressions, $$J_p=p(dT/dt), \tag{14}$$

provides a direct measurement of p, provided that there is a known and sufficient time-rate of temperature change.

In common practice, the time-rate of temperature change is accomplished by cyclical shuttering between the pyroelectric detector and the heat energy source, which is at the temperature that is to be measured. To overcome the foregoing time-constant degeneration of an externally measured $E_s$, the pyroelectric sensor of area A is reset to a polarized state, the shutter is opened and the immediate current $I_p$ is measured for a short time. However, in low energy level measurements, where the ambient noise equates to the signal energy, the shuttering technique is penalized by the requirement that approximately one-half of the heat energy is wasted by the shuttering operation.

To be complete, it must be understood that the temperature in all of the above discussion is the temperature of the ferroelectric material. If the sensor is intimately coupled to the object of which the temperature is to be measured, the accuracy is strictly determined by conventional thermal conductivity considerations. On the other hand, when the sensor is used to detect the heat radiated from a remote object, for example, infrared radiation, that energy must be received by an absorber, and then conducted to the sensor because the sensor itself does not customarily respond directly to infrared energy. The absorber is in effect an electromagnetic radiation impedance matching stub layer of intermediate impedance and specified thickness. Therefore, even though the ferroelectric sensor material is restricted to operation across only a narrow temperature range near the Curie temperature, the overall system can respond to a very broad range of radiation source temperatures.

Heretofore, all of the known ferroelectric/pyroelectric sensors that convert varying radiation energy to usable electrical signals greater than the inherent ambient noise of the sensor system operate in a passive mode. This means that the pyroelectric element operates at a given polarization state which is a function of temperature change, without any electrical polarization reversal. More specifically, passive pyroelectric detection only interrogates the polarization state of the ferroelectric material typically by measuring the net voltage across a poled capacitor structure, or by small signal AC excitation to determine the permittivity of the material (which is a function of the poled state), or some combination of these two methods. The practice in the industry to compare ferroelectric/pyroelectric sensors has been to measure the pyroelectric coefficient p. What this means is that for a physical geometry having sensor area A, the amount of coulombs of charge Q that are generated per degree Kelvin K, the pyroelectric coefficient p is expressed as: $p=(1/A)[\Delta Q/\Delta K]$. Unfortunately, this technique only represents a single cycle around a minor portion of the available signal energy as represented by the hysteresis loop area.

Figure 2:
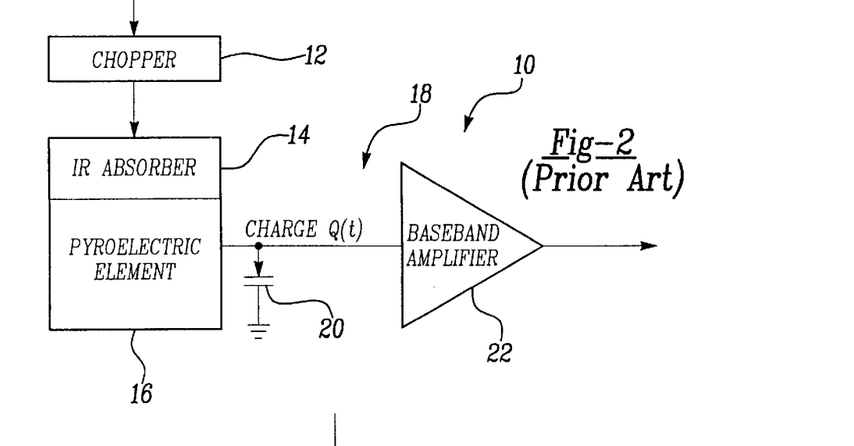
FIG. 2 is a schematic block diagram of a known passive pyroelectric sensor system.

FIG. 2 shows a schematic block diagram of a known pyroelectric sensor system 10 that employs a conventional passive charge generation technique to determine the output of the sensor element. The sensor system 10 includes a chopper 12 that selectively gates radiation from a scene onto an infrared absorber 14 that is part of a pyroelectric element 16. The pyroelectric element 16 is made of a ferroelectric material that exhibits hysteresis loops which vary with temperature as shown in FIG. 1, and represents a single pixel element of the sensor system 10 that combines with other pixel elements (not shown) to generate an image, as is well understood in the art. The discussion herein is directed to an infrared imaging system, but as will be appreciated by those skilled in the art, sensor systems of this type are applicable to detect other wavelengths of radiation, including millimeter waves and microwaves.

The chopper 12 selectively blocks and passes the radiation directed to the pyroelectric element 16 at a predetermined frequency so that the pyroelectric element 16 sees a reference temperature when the chopper 12 is closed, and sees the temperature of the scene when the chopper 12 is open. The difference between the reference temperature and the scene temperature alters the shape of the hysteresis loop as shown in FIG. 1. The change in charge Q(t) 18 for the two loops is measured separately as a voltage across a sampling capacitor 20 and an amplifier 22, in a manner that is well understood in the art. Because no external electric field is applied to the pyroelectric element 16, the measured charge of the pyroelectric element 16 that charges the capacitor 20 for the two loops is the charge Q(t) where the hysteresis loop crosses the positive vertical axis for temperature $T_1$ and the charge Q(t) where the hysteresis loop crosses the positive vertical axis for temperature $T_2$. The sampling capacitor 20 stores the charge from the pyroelectric element 16 only each time the window is opened by the chopper 12. The effective pyroelectric coefficient p for this design is given as:

$$p=(1/A)[Q_1-Q_2]/[T_1-T_2] \quad (15)$$

Figure 3:
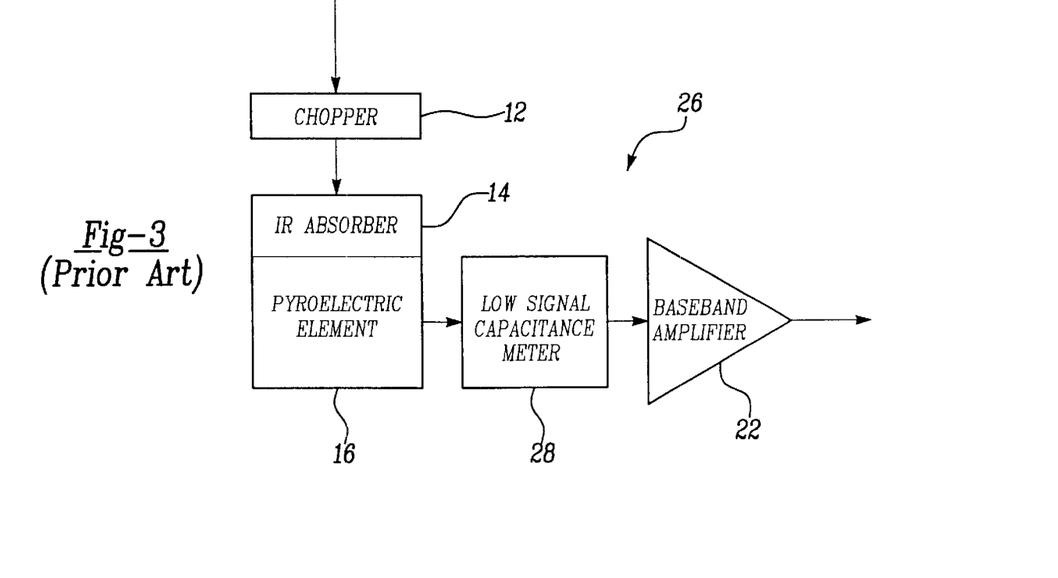
FIG. 3 is a schematic block diagram of another known passive pyroelectric sensor system.

In an alternate known design, the small signal level capacitance, (i.e. change in local slope of the Q versus V curve of either a poled or unpoled ferroelectric material) of the pyroelectric element 16 is measured for temperature $T_1$ and $T_2$ and then compared. FIG. 3 shows a schematic block diagram of a sensor system 26 including the chopper 12, the infrared absorber 14, the pyroelectric element 16 and the amplifier 22. Sometimes, a small bias voltage is applied to the pyroelectric element 16 from a bias source (not shown), and a capacitance meter 28 is used to measure the change in capacitance between the location on the hysteresis loop for both temperatures $T_1$ and $T_2$ relative to the bias voltage. Even though a small bias voltage is applied to the pyroelectric element 16 in this design, the mode of operation is still passive because the small bias voltage does not alter the polarization state of the ferroelectric material in any way, but merely measures its change in local permittivity as measured by a change in capacitance. The effective pyroelectric coefficient p is given as:

$$p=[(V_{rms})/A](\Delta C/\Delta T) \quad (16)$$

As is apparent, this detection scheme utilizes only a small portion of the hysteresis loop, and therefore the sensors are limited in their ability to differentiate signal from noise. Both of the techniques discussed above are dependent upon the condition that the ferroelectric material is left resident in one of its two spontaneous polarization states $P_s$ (+ or −), or some intermediate state thereof. The ability to measure the power from the pyroelectric element 16 between the temperature changes gives the sensitivity of the system. Because the signal-to-noise ratio is relatively low for the prior art sensors, this establishes the sensitivity of the entire system. Robust and relatively expensive system components, such as the chopper 12 and the amplifier 22 cannot increase the signal from noise, but only can prevent further degradation.

What is needed is a ferroelectric/pyroelectric sensor that measures more of the available signal energy from the hysteresis loop output from the pyroelectric element, and makes use of all of the heat energy available from the heat source to provide a better signal-to-noise ratio than is currently available in the prior art sensors. It is therefore an object of the present invention to provide such a sensor.

SUMMARY OF THE INVENTION

In accordance with the teachings of the present invention, a ferroelectric/pyroelectric sensor is disclosed that employs a technique of active excitation of the ferroelectric material by respectively changing its polarization state during a particular time period. An external AC signal is applied to the pyroelectric element to cause the hysteresis loop output from the element to cover a portion of the loop in accordance with the polarization direction change. Any suitable charge integration circuit can be employed to measure the charge from the pyroelectric element in response to the incident radiation. For example, a combination of a capacitor and operational amplifier can provide the charge integration, and a suitable rectifier and filtering circuit can be used to provide signal filtering. The sensor does not employ a chopper for providing a reference potential, but instead measures the charge from the ferroelectric material as a function of the spontaneous polarization of the material where the measured charge is directly proportional to the temperature of the material.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments directed to an active pyroelectric sensor system is merely exemplary in nature, and is in no way intended to limit the invention or its applications or uses.

Because the conventional pyroelectric sensor designs discussed above do not switch $P_s$ from its initial state during interrogation, closer analysis suggests that the large energy product of the ferroelectric material identified by the hysteresis loop has not yet been fully exploited by the industry. The product of the remnant polarization $P_r$ in the fully polarized state, and the coercive electric field $E_c$ required to remove all such residual polarization, is generally identified as the energy product $P_r E_c$. This $P_r E_c$ product has the dimensions of energy density, which serves to compare the "hardness" or energy storage capabilities of such materials. Hence, by employing $P_s$ switching, this invention proposes that the entire hysteresis loop may be traversed numerous times at a given temperature to provide a static measurement with an enhanced signal-to-noise ratio. This rail-to-rail switching of the $P_s$ is tantamount to active operation of the ferroelectric material at a significant power level, as opposed to the very weak levels in the traditional passive or near passive techniques discussed above. As the temperature of the sensor changes, the area within the hysteresis loop changes, and this change can be rapidly monitored due to the active nature of the sensor design.

The area within the hysteresis loop represents the energy dissipated per cycle of excitation. Thus, the continuously alternating excitation of the ferroelectric material causes dissipation of energy at some equilibrium temperature level. However, this level of dissipation is continuously modulated by the external heat applied to, or drawn from, the sensor (scene energy), and it is this change in equilibrium level that represents the change in temperature in each pixel element of the sensor system as required for an electrical output thereof. The loop area difference associated with the two different temperatures $T_1$ and $T_2$ represents stored polarization energy delivered by or received at the ferroelectric energy storage device. This polarization dependent energy change is the difference between the two dissipation energy levels as a result of the cyclical E field excitation. By the active nature of the sensor circuitry of the invention, the accuracy in measurement of this small energy change is enhanced by the frequency of measurement i.e., bandwidth limiting, signal summing, and noise averaging.

The invention described herein fully exploits all of the temperature-sensitive energy stored in the atomic structure of the pyroelectric material, as accomplished by AC excitation actively traversing the entire saturated major hysteresis loop. This carrier frequency permits signal summing many times per chopper window. In essence, it is an active amplification process in that the external AC excitation is employed to vigorously stimulate all of the energy stored in the lattice of the pyroelectric material, and this high level of power is now controlled by the minor infrared perturbation signal of the incident radiation.

Figure 4:
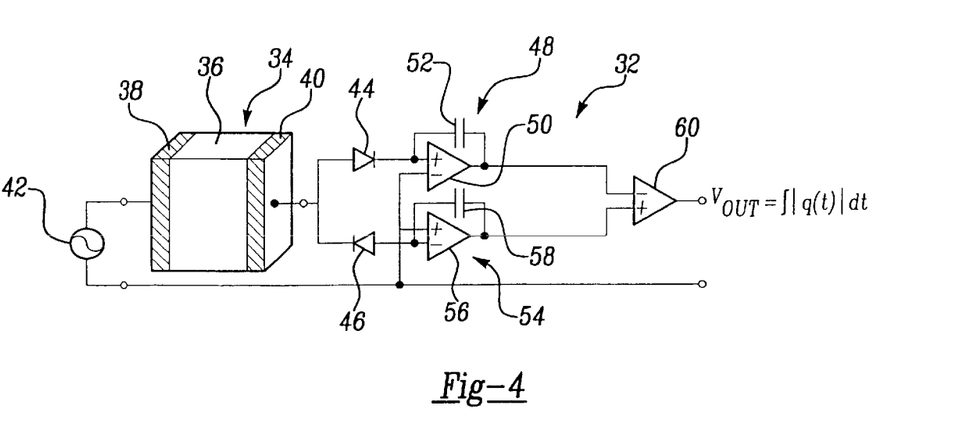
FIG. 4 is a schematic diagram of an active pyroelectric sensor system, according to an embodiment of the present invention.

FIG. 4 is a schematic diagram of a pyroelectric sensor system 32, according to an embodiment of the present invention, that provides the active pyroelectric element excitation discussed above. The system 32 includes a pyroelectric element 34 that includes a block 36 of ferroelectric material sandwiched between two electrodes 38 and 40. An alternating current source 42 applies an alternating voltage potential to the electrode 38 at a predetermined frequency. A chopper (not shown in FIG. 4) selectively allows radiant energy from a scene to impinge the block 36 when the shutter is opened, and provide a reference temperature to the ferroelectric element 34 when the shutter is closed at a predetermined frequency. The charge generated by the voltage potential from the source 42 and the charge generated by the ferroelectric block 36 from the incident radiation is collected by the electrode 40. The voltage potential from the source 42 is large enough so that the charge drives the hysteresis loop output of the block 36 from an entire loop. As the radiant energy applied to the pyroelectric element 34 changes in response to the scene, the shape and area of the hysteresis loop changes accordingly, consistent with the discussion above.

The output voltage collected by the electrode 40 is applied to a first rectifying diode detector 44 and a second rectifying diode detector 46. When the voltage potential from the source 42 is positive, the detector 44 conducts, and when the voltage potential from the source 42 is negative, the detector 46 conducts. When the detector 44 is conducting, the charge from the pyroelectric element 34 is applied to an integrator 48 that includes an amplifier 50 and an integrating capacitor 52. Each time the detector 44 conducts, charge is added to the capacitor 52 and is amplified by the amplifier 50. An integrator 54, including an amplifier 56 and an integrating capacitor 58, accumulates the charge when the detector 46 is conducting, so that the combination of the two integrators 48 or 54 continuously accumulates charge.

A summer 60 is continuously adding the charge from both of the integrators 48 and 54 to provide a summed charge output. An output of the summer 60 is sent to further processing circuitry (not shown) to provide a signal indicative of the one pixel of the image. A reset device (not shown) will reset the summer 60 in sync with the frequency of the chopper. Therefore, for a particular time frame for one temperature, the output from the summer 60 is the charge accumulated over multiple loop swings. In other words, the frequency of the source 42 is set so that for each time the chopper is closed, the charge generated by the element 34 through the hysteresis loop for the temperature $T_1$ will be measured several times. Likewise, when the chopper is opened, the charge generated by the element 34 through the hysteresis loop for the temperature $T_2$ is measured the same amount of times. In one embodiment, for example, the AC frequency from the source 42 is set at 1.5 kHz and the chopper period is set at 15 frames per second, giving 100 polarization cycles through the hysteresis loop per chopper window. The summer 60 is zeroed after each time period so that the two values can be compared. Therefore, the charge gets measured for the entire hysteresis area for a particular time window, but gets measured multiple times over that time period, significantly increasing the signal-to-noise level over the sensors described above in the prior art.

The amplitude of the AC signal from the source 42 can be selected to drive the hysteresis loop from rail-to-rail to cover the entire charge available from the pyroelectric element 34. This gives a full polarization reversal of the element 34 for each AC cycle. Alternately, the amplitude of the AC signal can be reduced to only cover a portion of the hysteresis loop, but the multiple charge measurements during the particular time frame still provides significant signal averaging over those pyroelectric sensor systems known in the art. By only covering a portion of the hysteresis loop, the element 34 only undergoes a partial polarization reversal. It should be noted that a DC bias can be applied to the element 34 in addition to the AC signal to define a different coverage of the hysteresis loop. As long as the magnitude of the AC signal does not exceed the coercive strength of the loop, causing the pyroelectric element 30 to break down, the multiple signal averaging technique of the invention will benefit the signal-to-noise ratio.

Figure 5:
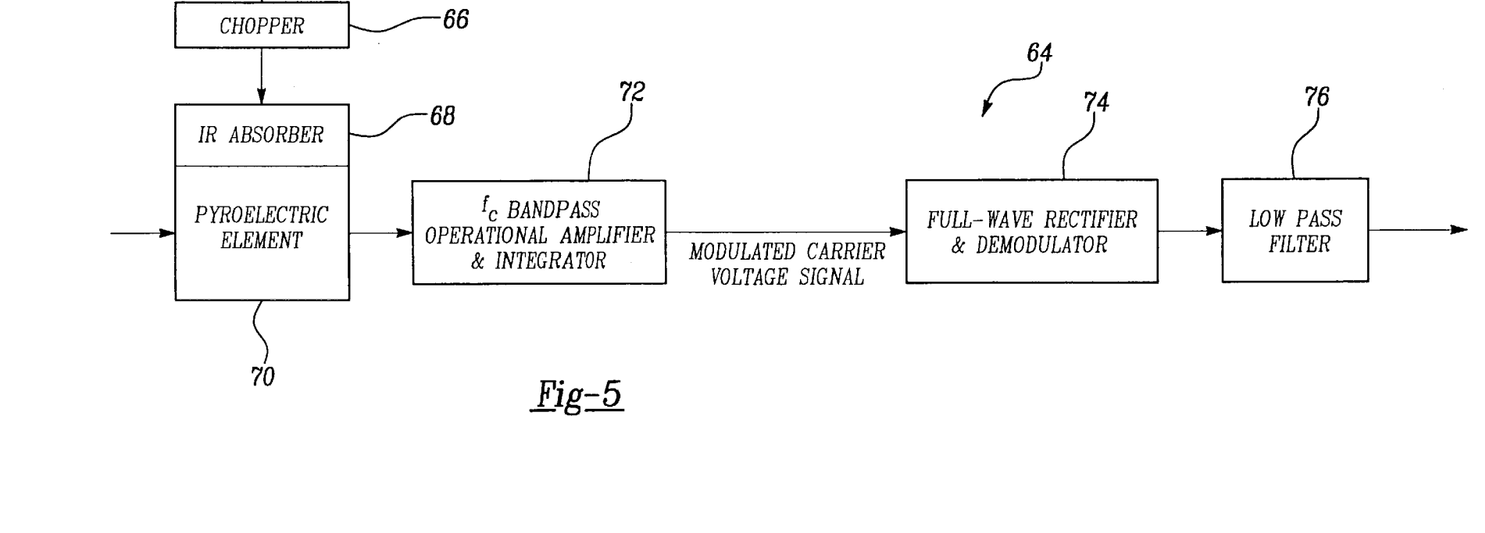
FIG. 5 is a block diagram of another active pyroelectric sensor system of the invention.

FIG. 5 shows a block diagram of a pyroelectric sensor system 64, according to the invention, showing the operation of the invention as just described. A chopper 66 intermittently applies radiation to an infrared absorber 68 that is part of a pyroelectric element 70 in the manner as discussed above. Additionally, a constant amplitude frequency signal is applied to the pyroelectric element 70 from the source 42. The charge Q(t) for the full rail-to-rail saturation of the hysteresis loop of the pyroelectric element 70 is applied to a $f_c$ bandpass operational amplifier and integrator 72, representing the integrators 48 and 54 above. The modulated carrier voltage signal from the integrator is applied to a full-wave rectifier and demodulator 74 representing the detectors 44 and 46 above, and then to a low pass filter 76 to get the electrical output signal.

Figure 6:
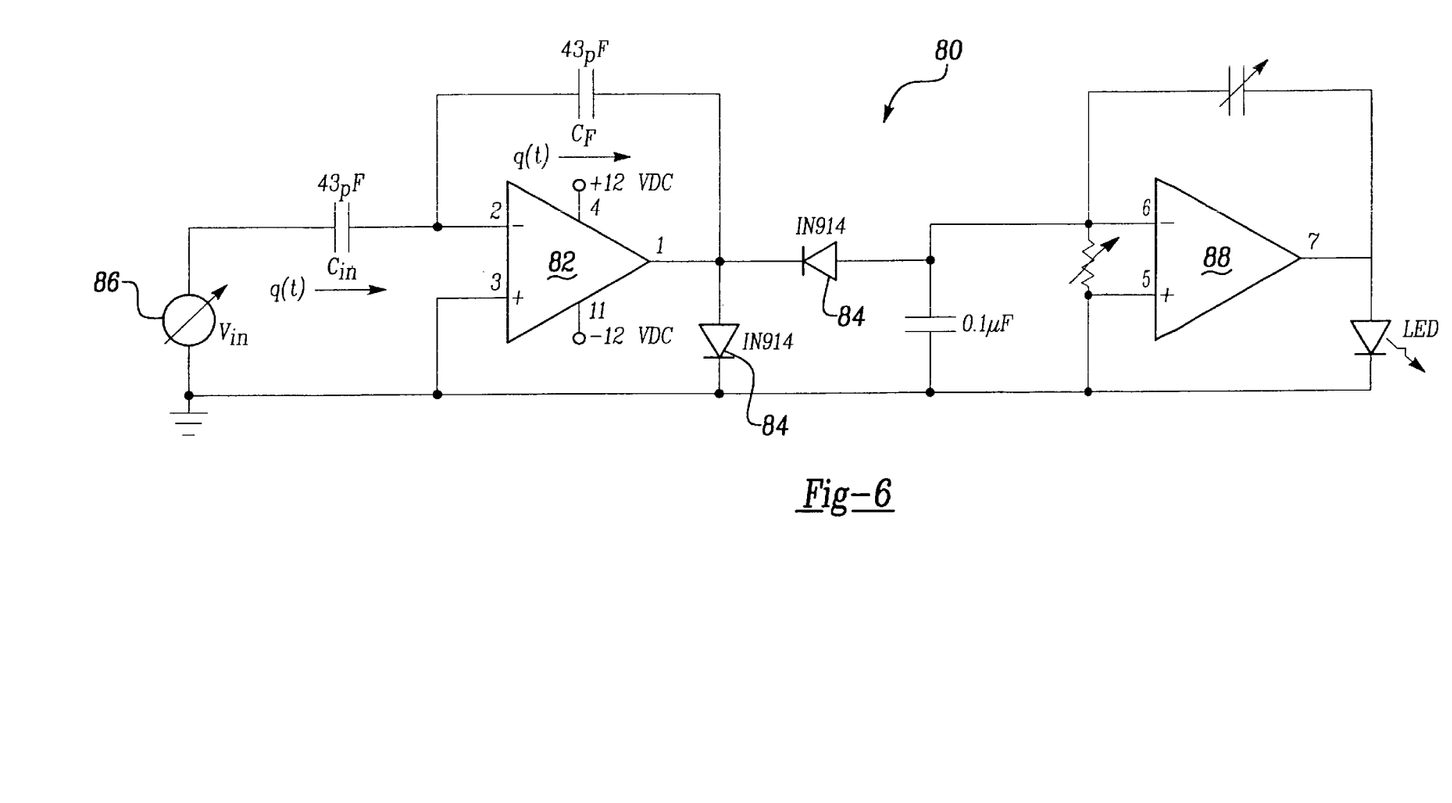
FIG. 6 is a schematic diagram of another active pyroelectric sensor system according to the invention.

FIG. 6 is a schematic diagram of a pyroelectric sensor system 80 according to the invention that is an implementation that exploits all of the generated energy at the sensor by active amplification of the charge of the sensor system 32, discussed above. The system 80 includes a capacitor $C_F$ that accumulates the charge from the pyroelectric element, that is amplified by an operational amplifier 82, such as a JFET operational amplifier, TL084CN. A pair of diode detectors 34 detect the charge from the element, as generated by an AC source 86. An operational amplifier 88 acts as a summer to sum the integrated charge. The sensor system 80 provides the same charge accumulation for both the positive and negative components of the AC signal to provide the multiple charge additions over the hysteresis loop. The particular device components are labeled in the figure for this embodiment.

The concept of the invention discussed above can also be used in ferroelectric/pyroelectric sensors that don't require a chopper or shutter. Instead of the traditional method of forcing the temperature to be a function of time to cause a change in the spontaneous polarization, according to an alternate embodiment of the present invention, the spontaneous polarization is directly made to be a function of time by virtue of the active electric field excitation of the sensor. If the exciting electric field is a function of time, E=E(t), a large change in the spontaneous polarization can be obtained, while the temperature may remain absolutely constant. Consequently, the actively excited system behaves as a truly accurate static measurement of temperature. The fullest possible range in polarization reversal, which is repeated twice per cycle of excitation, can be performed at frequencies limited only by the ferroelectric frequency response. It has been recognized that the pyroelectric coefficient p has no meaning in this pyrometry technique, because $p=\partial P_s/\partial T$ is indeterminate. That is, there is no change in temperature involved in pure pyrometric static temperature measurements.

However, as already discussed above, $P_s$ is also time-dependent due to the p$\epsilon$ time-constant. Thus, more generally:

$$P_s = P_s(T,E,t). \qquad (17)$$

The total differential expression for $P_s$ is then, $$dP_s = (\partial P_s/\partial T)dT + (\partial P_s/\partial E)dE + (\partial P_s/\partial t)dt, \qquad (18)$$

which more practically is expressible as:

$$\Delta P_s = (p^*)\Delta T + (\epsilon^*)\Delta E + (j^*)\Delta t. \qquad (19)$$

It can readily be seen that the starred pyroelectric coefficient is the basis of the known state-of-the-art, whereas the second partial derivative in the equation (19) is the basis for the entirely new insight leading to the technique of the present invention. The third partial derivative term in equation (19) is a current density. This current is the item that the state-of-the-art techniques attempt to overwhelm by chopping the temperature, while in the present invention, it is defeated by the frequency of hysteresis cycling.

In addition to the electrical time-constant discussed above, there is an equally important thermal time-constant that dictates a temperature transient. The response time at high frequency excitation is limited only by the thermal time-constant of the sensor. In thin film ferroelectrics, the volume, specific heat and thermal conductivity effects can be minimized by careful design to increase the speed of response. In any event, the active excitation technique will always provide a response far superior to that of the conventional shuttered systems.

In the embodiments discussed above, the temperature due to the heat incident upon the pyroelectric element is converted to a time-varying function by the mechanical shutter or chopper between the heat energy source and the pyroelectric element. Unfortunately, the shuttering action rejects essentially one-half of the incident thermal power, which significantly decreases the signal-to-noise ratio. Further, the shutter distinctly limits the detection to only radiated heat, particularly infrared radiation. In accordance with this embodiment of the present invention, the technique for charge integration of a ferroelectric/pyroelectric element from incident radiation and from a voltage potential can be extended to a pyroelectric sensor that does not employ a mechanical chopper or otherwise, but where the incident radiation is continually being applied to the pyroelectric element.

Various circuit designs can be employed to provide the chopperless sensor system as described above. One circuit technique is to use the rms value of the current pulses as the analog of the temperature. In this design, the current pulses can be sampled through a low value series resistor to provide an equivalent voltage analog of the polarization reversal current. The output voltage waveform is rectified, filtered and metered, or visually displayed by some other state-of-the-art technique. A major advantage of the major hysteresis loop cycling is that the output alternating signal can be very large by the selection of the resistor size, and consequently the diode detectors are not required to operate in their noisy non-linear regions. The use of a sampling resistor is adequate provided that the temperature signal information is well above the ambient noise level. In this design, no effort has been expended towards maximizing power transfer by impedance matching. Therefore, to capture more of the available thermal power and to also reduce the Johnson noise caused by the sampling resistor, it may be desirable to employ an operational amplifier in the detector circuitry.

In another design, it is desirable to use charge signals directly, without first converting to a time-rate of charge, which always implies current through an energy dissipating resistor. Furthermore, time derivatives always introduce additional noise. The thermal source must deliver energy to a pyrometer, if its temperature is to be determined. The fundamental characteristics of the ferroelectric material is that it has an inherent capacity to store huge energy densities. But, since the energy stored is a function of temperature, the modifying heat source can modify the energy stored. Accordingly, a measurement of the change in stored charge energy is a direct analog of the incident heat energy. In low energy level operation, such as night vision in ambient temperature environments, all possible energy incident upon the sensor must be captured to realize the maximum possible signal-to-noise ratio. The charge state of the ferroelectric device can be sampled by a series capacitor that cannot introduce any dissipation of energy. However, in the end, a practical display device will consume some energy.

It is more desirable to eliminate the resistors completely by use of an operational amplifier connected as a charge amplifier without use of a resistor. As discussed above, the energy is stored within a sensor in the form of bound-charge. So, the full $Q_s$ values may be exploited directly without conversion to current. In fact, all of the incident thermal energy is transferred to the operational amplifier feedback capacitor, where the energy is then amplified beyond any additional noise. By comparison, a capacitor shunted across the charged capacitor receives at most only ¼th of the original energy, and the total system energy is diminished by ½ as the penalty for energy rearrangement.

Figure 7:
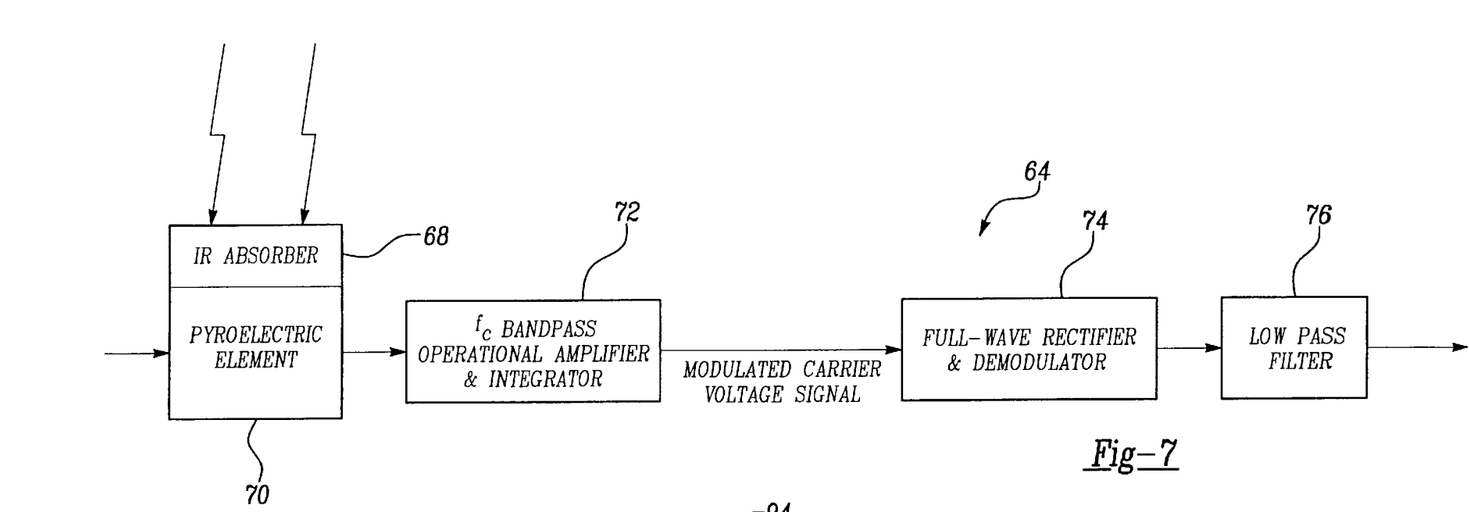
FIG. 7 is a block diagram of an active pyroelectric sensor system, that does not require use of a chopper, according to another embodiment of the invention.
Figure 8:
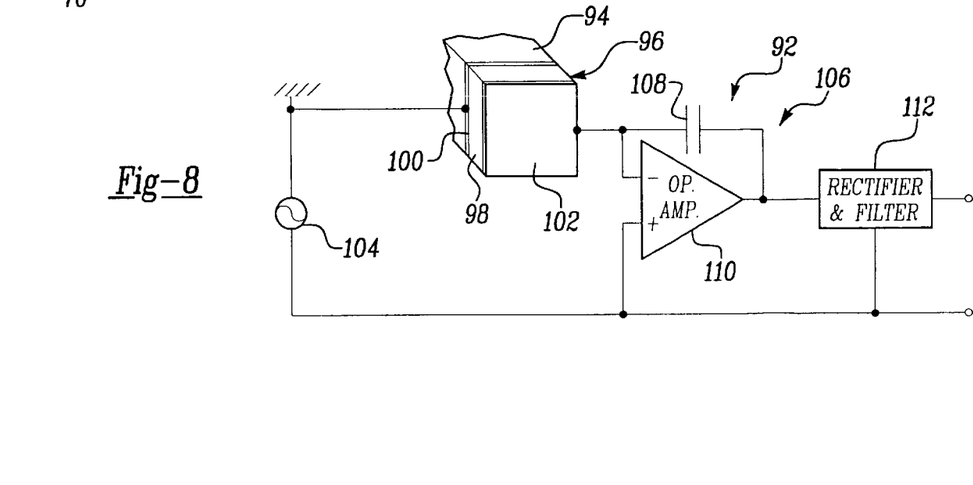
FIG. 8 is a more detailed schematic-type diagram of the sensor system shown in FIG. 7.

The embodiments of the ferroelectric/pyroelectric sensor discussed above without use of a chopper is depicted below with respect to FIGS. 7 and 8. FIG. 7 shows the sensor system 64, with the chopper 66 eliminated, to depict this embodiment of the present invention. Therefore, the charge integration from the amplifier in the integrator 72 is directly proportional to the temperature of the pyroelectric element 70, as opposed to taking a difference between a reference potential and the temperature signal of the previous embodiments. Any suitable charge integration circuit can be employed for measuring the charge, as discussed above.

Instead of making the charge integration of the temperature a time-varying function, this embodiment of the present invention is based on the recognition that the spontaneous polarization of the pyroelectric element 70 can itself be directly forced to be the required time-varying function, $P_s=P_s(t)$. This allows the temperature to remain undisturbed, while a static measurement is obtained. The time-variation of $P_s$ is accomplished by the cyclical external electric-field excitation of the ferroelectric around the hysteresis loop. Therefore, not only is the need for an energy-wasteful shutter obviated, but the signal-to-noise ratio is significantly increased by the cyclical repetition discussed above, which tends to average out all of the random ambient noises.

By removing the need for the shutter according to this embodiment of the present invention, the pyroelectric sensor can be employed as a direct contact sensor where the pyroelectric element is in direct contact with the heat source. FIG. 8 shows a schematic block diagram of a pyroelectric sensor system 92 that senses the temperature of a thermal source 94. The sensor system 92 includes a pyroelectric sensor 96 having a ferroelectric/pyroelectric element 98 sandwiched between opposing electrodes 100 and 102. The thermal source 94 is positioned in direct contact with the electrode 100. The operation of the remaining part of the sensor system 72 is the same as discussed above, where the sensor system 92 includes an alternating current source 104, a charge amplification system 106 including a capacitor 108 and an operational amplifier 110, and a rectifier and filtering circuit 112.

The discussion above provides signal averaging to increase signal-to-noise ratio in a pyroelectric sensor. Additionally, because the sensor circuitry does not employ resistors, the Johnson noise of the sensor is further reduced. The technique of the invention has application to other types of sensors, detectors and devices that do not make use of ferroelectric materials and the pyroelectric effect but exhibit a hysteresis loop output. Particularly, if a certain material exhibits a hysteresis loop response to an input signal, then the multiple signal averaging technique of the invention may be applicable to those types of systems. Another type of sensor may include a magnetic type material exhibiting a hysteresis type loop response to external stimuli, such as strain.

The foregoing discussion discloses and describes merely exemplary embodiments of the present invention. One skilled in the art will readily recognize from such discussion, and from the accompanying drawings and claims, that various, changes, modifications and variations can be made therein without departing from the spirit and scope of the invention as defined in the following claims.

What is claimed is:

1. A pyroelectric sensor system comprising:
   an alternating voltage source generating an alternating voltage at a predetermined frequency;
   a pyroelectric sensor element responsive to the alternating voltage, said pyroelectric sensor element generating a hysteresis loop charge output in response to the alternating voltage, said alternating voltage driving the sensor element over at least a portion of the hysteresis loop output of the element; and
   a charge integration system responsive to the charge output from the pyroelectric sensor element, said integration system measuring the spontaneous polarization of the element and generating a signal that is directly proportional to the temperature of the sensor element.

2. The system according to claim 1 wherein the pyroelectric sensor element is responsive to radiative thermal energy.

3. The system according to claim 1 wherein the pyroelectric sensor element is in direct contact with a thermal heat source.

4. The system according to claim 1 wherein the alternating voltage has a potential that is large enough to drive the hysteresis loop charge output to provide a full polarization reversal for each alternating voltage cycle.

5. The system according to claim 1 wherein the alternating voltage has a potential that only drives the hysteresis loop charge output over a portion of the polarization reversal for each alternating voltage cycle.

6. The system according to claim 1 further comprising a bandwidth limiting filter that receives the hysteresis loop charge output and provides bandwidth filtering of the output.

7. The system according to claim 1 wherein the pyroelectric sensor element includes a ferroelectric material positioned between a first capacitive plate and a second capacitive plate, said alternating voltage being applied to the first capacitive plate and said hysteresis loop charge output being taken from the second capacitive plate.

8. The system according to claim 1 wherein the sensor system is an infrared imaging system and the sensor element includes an infrared absorber that absorbs infrared radiation directed at the sensor element from a scene.

9. The system according to claim 1 wherein the charge integration system includes a first detector responsive to the hysteresis loop charge output and a second detector responsive to the hysteresis loop charge output, said first detector generating a first voltage output from positive components of the alternating voltage and said second detector generating a second voltage output from negative components of the alternating voltage.

10. The system according to claim 9 wherein the charge integration system further includes a first integrator responsive to the first voltage output and a second integrator responsive to the second voltage output, said first integrator adding the first voltage output for multiple positive components of the alternating voltage and the second integrator adding the second voltage output for multiple negative components of the alternating voltage, said integration system further including a summer responsive to the first added voltage output and the second added voltage output.

11. A pyroelectric sensor system for measuring temperature, said system comprising:
    an alternating voltage source generating an alternating voltage at a predetermined frequency;
    a pyroelectric sensor element responsive to the alternating voltage, said pyroelectric sensor generating a hysteresis loop charge output that follows a hysteresis loop of the element in response to the alternating voltage, said hysteresis loop of the sensor element changing shape when the sensor element changes temperature; and
    a processing system responsive to the hysteresis loop charge output from the sensor, said signal processing system detecting and integrating the charge output from the sensor element, wherein the charge output is a time-varying function from the spontaneous polarization of the element that: is proportional to the temperature of the element.

12. The system according to claim 11 wherein the pyroelectric sensor element is responsive to radiative thermal energy.

13. The system according to claim 11 wherein the pyroelectric sensor element is in direct contact with a thermal heat source.

14. The system according to claim 11 wherein the alternating voltage has a potential that is large enough to drive the hysteresis loop charge output to provide a full polarization reversal for each alternating voltage cycle.

15. The system according to claim 11 wherein the alternating voltage has a potential that only drives the hysteresis loop charge output over a portion of the polarization reversal for each alternating voltage cycle.

16. The system according to claim 11 wherein the processing system includes a first detector responsive to the hysteresis loop charge output and a second detector responsive to the hysteresis loop charge output, said first detector generating a first voltage output from positive components of the alternating voltage and said second detector generating a second voltage output from negative components of the alternating voltage.

17. The system according to claim 11 wherein the sensor system is part of an infrared imaging system for imaging a scene.

18. A method of determining a charge output from a pyroelectric element, said method comprising the steps of:

applying an alternating voltage to the pyroelectric element;

detecting a hysteresis loop charge output of the pyroelectric element over a predetermined time period; and integrating the detected charge output over a plurality of cycles of the alternating voltage for the predetermined time period, wherein the integrated charge is a measure of the spontaneous polarization of the element and is proportional to the temperature of the pyroelectric element.

19. The method according to claim 18 further comprising the step of applying heat radiation to the pyroelectric element in a radiative manner.

20. The method according to claim 18 further comprising the step of directly attaching the pyroelectric element to a heat source so that the pyroelectric element receives heat by conduction.

21. The method according to claim 18 wherein the magnitude of the alternating voltage is large enough to drive the hysteresis output to a full polarization reversal for each alternating voltage cycle.

22. The method according to claim 18 wherein the magnitude of the alternating voltage is selected to provide a limited polarization reversal for each cycle of the alternating voltage.

* * * * *